(12) United States Patent
Son et al.

(10) Patent No.: US 9,083,270 B2
(45) Date of Patent: Jul. 14, 2015

(54) ELECTRIC BICYCLE DRIVING APPARATUS

(71) Applicant: MANDO CORPORATION, Gyeonggi-do (KR)

(72) Inventors: Hong Youp Son, Gyunggi-do (KR); Kawn Seek Kim, Gyeonggi-do (KR)

(73) Assignee: MANDO CORPORATION, Pyeontaek-Si, Gyeonggi-Do (KR)

( * ) Notice: Subject to any disclaimer, the term of this patent is extended or adjusted under 35 U.S.C. 154(b) by 90 days.

(21) Appl. No.: 13/683,268

(22) Filed: Nov. 21, 2012

(65) Prior Publication Data

US 2014/0077740 A1 Mar. 20, 2014

(30) Foreign Application Priority Data

Sep. 19, 2012 (KR) .......................... 10-2012-104168

(51) Int. Cl.
| | |
|---|---|
| *G05B 5/00* | (2006.01) |
| *H02P 1/00* | (2006.01) |
| *H02P 7/06* | (2006.01) |
| *B60L 11/00* | (2006.01) |
| *B60L 15/20* | (2006.01) |

(52) U.S. Cl.
CPC ................. *H02P 7/06* (2013.01); *B60L 11/007* (2013.01); *B60L 15/20* (2013.01); *B60L 2200/12* (2013.01); *Y02T 10/7275* (2013.01)

(58) Field of Classification Search
CPC ........ H02P 7/298; H02P 7/06; H02P 21/0089
USPC ............ 318/494, 454, 139, 268, 368; 701/22; 446/440, 468; 180/220
See application file for complete search history.

(56) References Cited

U.S. PATENT DOCUMENTS

| | | | | |
|---|---|---|---|---|
| 4,096,422 A | * | 6/1978 | Fleming et al. | ................ 388/819 |
| 4,523,139 A | * | 6/1985 | Schwarz et al. | .............. 320/130 |
| 6,314,238 B1 | * | 11/2001 | Imamura et al. | ................... 396/6 |
| 6,396,137 B1 | * | 5/2002 | Klughart | ....................... 257/691 |
| 7,016,203 B2 | * | 3/2006 | Xu et al. | ..................... 363/21.04 |
| 7,940,018 B2 | * | 5/2011 | Yonemori et al. | ............ 318/376 |
| 2005/0007047 A1 | * | 1/2005 | Strothmann et al. | .......... 318/268 |

FOREIGN PATENT DOCUMENTS

| | | | | | |
|---|---|---|---|---|---|
| JP | 2001-008480 | * | 1/2001 | ................ | H02P 6/06 |
| JP | 2001-008480 | * | 12/2001 | ................ | H02P 6/06 |
| JP | 2007-166686 | * | 6/2007 | ................ | H02P 8/38 |

* cited by examiner

*Primary Examiner* — Bentsu Ro
*Assistant Examiner* — Zemenay Truneh
(74) *Attorney, Agent, or Firm* — McDermott Will & Emery LLP

(57) ABSTRACT

Disclosed is an electric-bicycle driving apparatus. The electric-bicycle driving apparatus includes a speed-change mode operator to output a low-speed or high-speed mode signal, a controller to receive the low-speed or high-speed mode signal from the speed-change mode operator and to output a first or second control-signal corresponding to the low-speed or high-speed mode signal, a generation-signal provider to provide a generation-signal output from a generator, and a motor-driver operating-signal regulator to receive the first or second control signal when the speed-change mode operator outputs the low-speed or high-speed mode signal, to regulate a level of the generation-signal output from the generation-signal provider and to provide the resulting signal to a motor driver that drives a motor, the motor-driver operating-signal regulator providing a lowered level of generation-signal to the motor driver that is operated upon receiving power of a battery, and cutting off an abnormal signal from the motor driver.

20 Claims, 6 Drawing Sheets

ELECTRIC BICYCLE DRIVING APPARATUS

CROSS-REFERENCE TO RELATED APPLICATION

This application claims the benefit of Korean Patent Application No. 2012-0104168, filed on Sep. 19, 2012 in the Korean Intellectual Property Office, the disclosure of which is incorporated herein by reference.

BACKGROUND

1. Field

Embodiments of the present invention relate to an electric bicycle driving apparatus.

2. Description of the Related Art

In general, electric bicycle driving apparatuses are provided to drive electric bicycles.

Most conventional driving apparatuses for electric bicycles have a limit to effective operation of a motor driver that drives a motor in a low-speed or high-speed motor driving mode, and consequently have a limit to reduction in battery power consumption.

In addition, conventional electric bicycle driving apparatuses may not function to cut off an abnormal signal from the motor driver, thus having difficulties in preventing malfunction and in stabilizing drive properties of electric bicycles.

Moreover, such a limit to cutoff of an abnormal signal from the motor driver may cause deterioration of the motor driver due to the abnormal signal, and therefore conventional electric bicycle driving apparatuses may have a difficulty in reducing repair/maintenance time and costs.

SUMMARY

Therefore, it is an aspect of the present invention to provide an electric bicycle driving apparatus which may apply a lowered level of generation signal to a motor driver that is operated upon receiving power of a battery, resulting in a reduction in battery power consumption.

It is another aspect of the present invention to provide an electric bicycle driving apparatus which may cut off an abnormal signal from a motor driver, thereby preventing malfunction and stabilizing drive properties of the electric bicycle.

It is a further aspect of the present invention to provide an electric bicycle driving apparatus which may discriminate an abnormal signal and prevent deterioration of a motor driver due to the abnormal signal, thereby achieving reduced repair/maintenance time and costs.

Additional aspects of the invention will be set forth in part in the description which follows and, in part, will be obvious from the description, or may be learned by practice of the invention.

In accordance with one aspect of the present invention, an electric bicycle driving apparatus includes a speed change mode operator to output a low-speed mode signal or a high-speed mode signal, a controller to receive the low-speed mode signal or high-speed mode signal output from the speed change mode operator and output a first control signal corresponding to the low-speed mode signal or a second control signal corresponding to the high-speed mode signal, a generation-signal provider to provide a generation signal output from a generator, and a motor-driver operating-signal regulator to receive the first control signal or second control signal when the speed change mode operator outputs the low-speed mode signal or high-speed mode signal, to regulate a level of the generation signal output from the generation-signal provider and to provide the resulting signal to a motor driver that drives a motor, wherein the motor-driver operating-signal regulator provides a lowered level of generation signal to the motor driver that is operated upon receiving power of a battery, and cuts off an abnormal signal transmitted from the motor driver.

The motor-driver operating-signal regulator may include a first switching device electrically connected to one side of the controller, more than one first resistor electrically connected to another side of the controller and first switching device, more than one third resistor electrically connected to the first switching device, motor driver and battery, more than one fourth resistor electrically connected to the more than one third resistor and first switching device, and a second switching device electrically connected to the generation-signal provider and more than one fourth resistor.

The more than one first resistor may include a first resistor and a second resistor for partial pressure.

The more than one fourth resistor may include a fourth resistor, a fifth resistor, and a sixth resistor for partial pressure.

Each of the first switching device and the second switching device may include at least one of a Metal-Oxide Semiconductor Field Effect Transistor (MOSFET) and a Bipolar Junction Transistor (BJT).

The motor-driver operating-signal regulator may further include more than one zener diode electrically connected to the generation-signal provider and more than one fourth resistor.

The second switching device may include more than one zener diode electrically connected to the generation-signal provider and more than one fourth resistor.

The motor-driver operating-signal regulator may further include more than one capacitor electrically connected to the second switching device, more than one third resistor and battery.

The more than one capacitor may be a smoothing capacitor.

The motor-driver operating-signal regulator may further include more than one rectifying diode electrically connected to the second switching device, more than one capacitor and battery.

The apparatus may further include a motor-driver operating-signal sensor electrically connected to the motor-driver operating-signal regulator and motor driver, the sensor serving to sense a current operating signal for the motor driver output from the motor-driver operating-signal regulator, wherein the controller contains a preset reference range of the operating signal for the motor driver, and a motor-driver operating-signal decider to decide whether or not the current operating signal for the motor driver sensed by the motor-driver operating-signal sensor is within the reference range of the operating signal for the motor driver under control of the controller, wherein the controller temporarily stops operation of the motor driver if the motor-driver operating-signal decider decides that the current operating signal for the motor driver is not within the reference range of the operating signal for the motor driver.

The controller may provide a display signal to a display if the motor-driver operating-signal decider decides that the current operating signal for the motor driver is not within the reference range of the operating signal for the motor driver.

The controller may provide an alarm signal to an alarm unit if the motor-driver operating-signal decider decides that the current operating signal for the motor driver is not within the reference range of the operating signal for the motor driver.

The generation-signal provider may include a generation-signal rectification part electrically connected to the generator to rectify the generation signal output from the generator, and a generation-signal storage part electrically connected to the generation-signal rectification part to store the generation signal rectified in the generation-signal rectification part.

The generation-signal rectification part may include more than one second rectifying diode electrically connected to one side of the generator, more than one fourth rectifying diode electrically connected to another side of the generator, and more than one sixth rectifying diode electrically connected to the other side of the generator.

The more than one second rectifying diode may include a second rectifying diode and a third rectifying diode connected to each other in series.

The more than one fourth rectifying diode may include a fourth rectifying diode and a fifth rectifying diode connected to each other in series.

The more than one sixth rectifying diode may include a sixth rectifying diode and a seventh rectifying diode connected to each other in series.

The generation-signal storage part may include more than one second capacitor electrically connected to the generation-signal rectification part and motor-driver operating-signal regulator.

The more than one second capacitor may include a second capacitor, a third capacitor and a fourth capacitor connected to one another in series.

The more than one second capacitor may include a smoothing capacitor.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
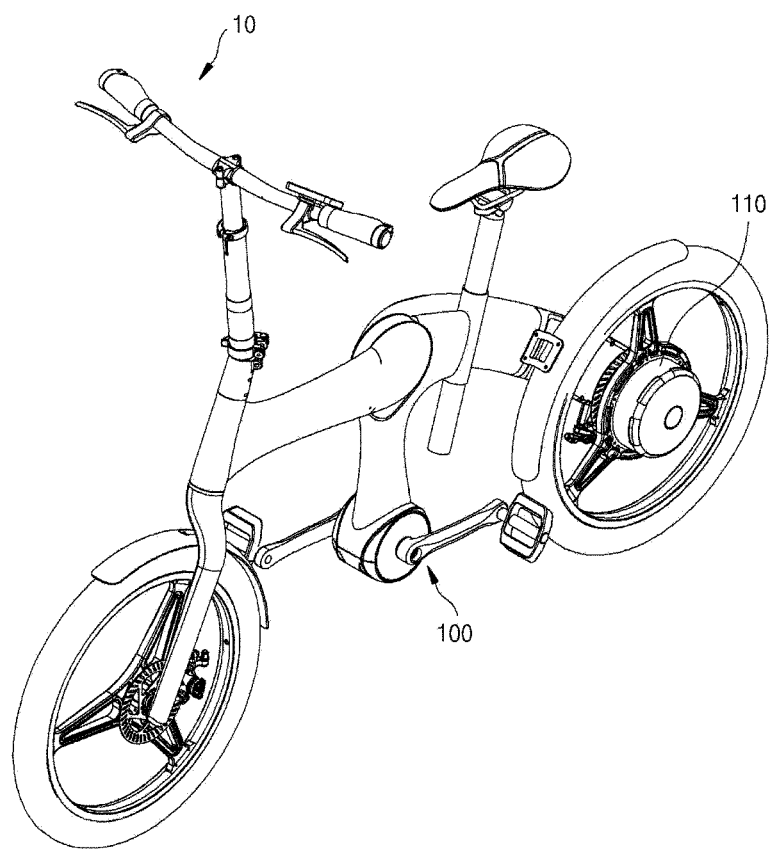
FIG. 1 is a perspective view illustrating an electric bicycle including an electric bicycle driving apparatus according to a first embodiment of the present invention.

Reference will now be made in detail to the embodiments of the present invention, examples of which are illustrated in the accompanying drawings, wherein like reference numerals refer to like elements throughout.

First Embodiment

Figure 2:
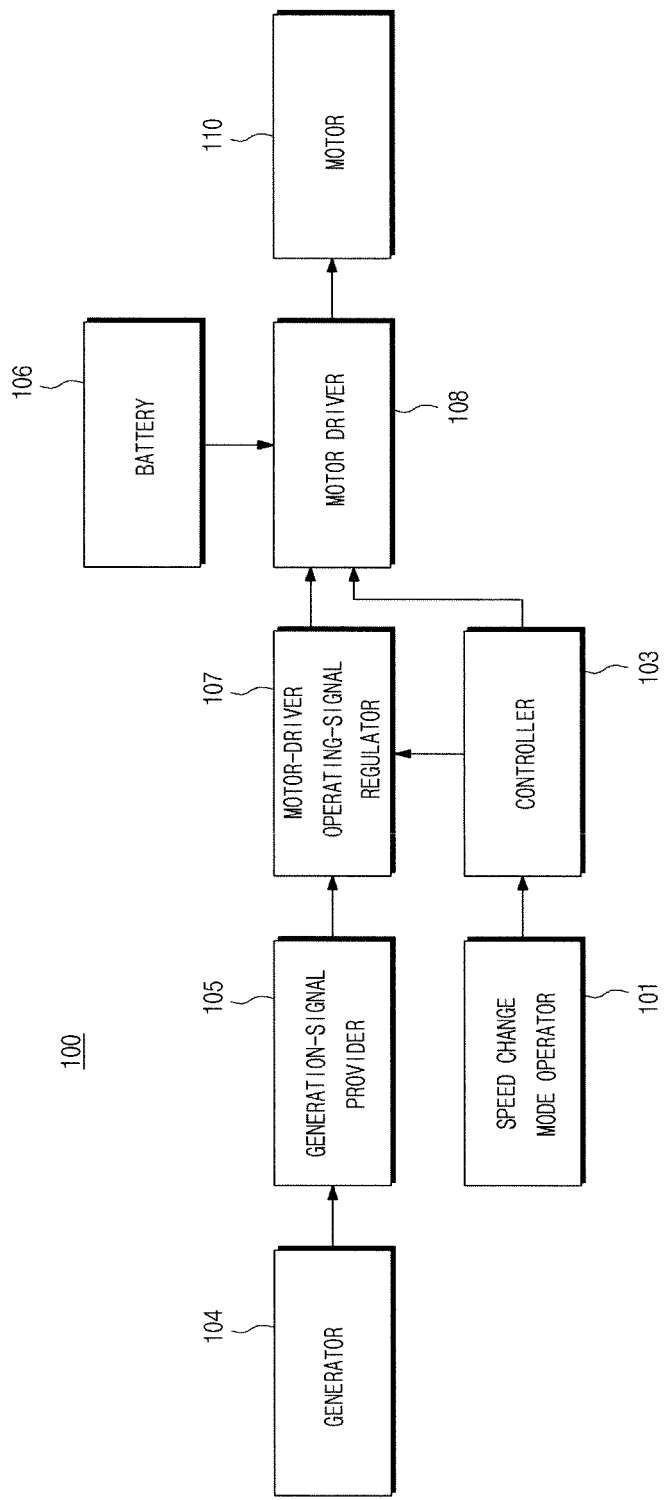
FIG. 2 is a block diagram illustrating a configuration of the electric bicycle driving apparatus according to the first embodiment of the present invention.

FIG. 1 is a perspective view illustrating an electric bicycle including an electric bicycle driving apparatus according to a first embodiment of the present invention, and FIG. 2 is a block diagram illustrating the configuration of the electric bicycle driving apparatus according to the first embodiment of the present invention.

Figure 3:
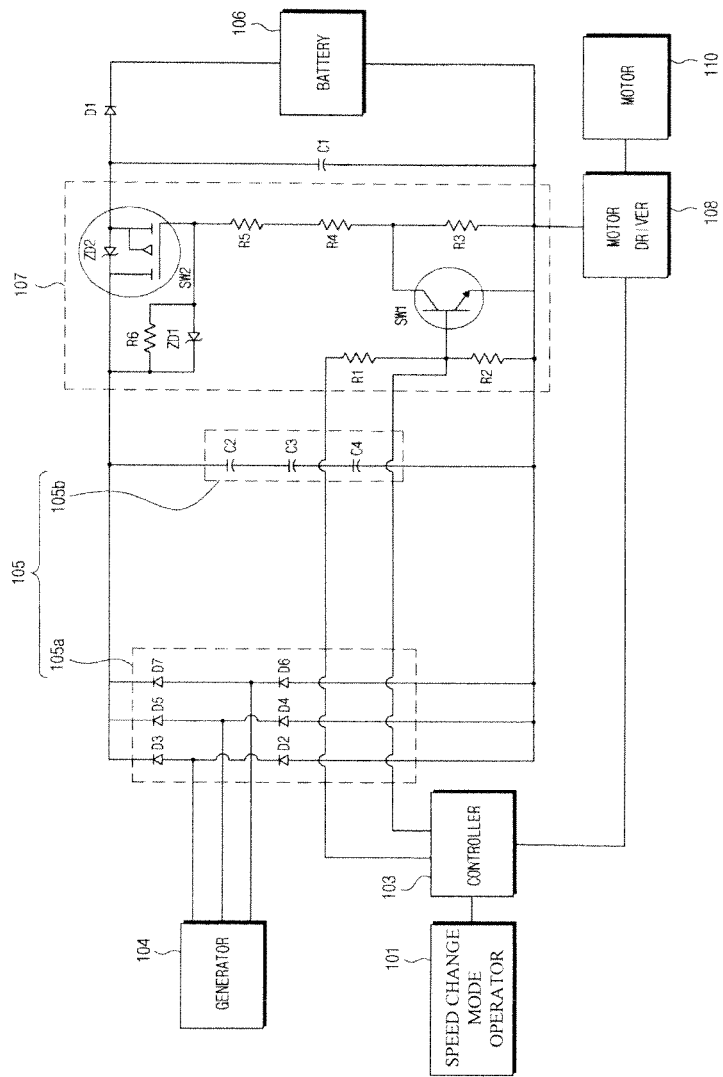
FIG. 3 is an equivalent circuit diagram illustrating an example of the electric bicycle driving apparatus according to the first embodiment of the present invention.

FIG. 3 is an equivalent circuit diagram illustrating an example of the electric bicycle driving apparatus according to the first embodiment of the present invention.

First, referring to FIG. 1, the electric bicycle driving apparatus according to the first embodiment of the present invention, denoted by reference numeral 100, is provided at one side and the other side of the electric bicycle, denoted by reference numeral 10.

Next, referring to FIGS. 2 and 3, the electric bicycle driving apparatus 100 according to the first embodiment of the present invention includes a speed change mode operator 101, controller 103, generation-signal provider 105, motor-driver operating-signal regulator 107, and motor driver 108.

The speed change mode operator 101 is provided to output a low-speed mode signal or a high-speed mode signal.

The speed change mode operator 101 may be provided at a portion of a handle bar of the electric bicycle 10.

The controller 103 receives the low-speed mode signal or high-speed mode signal output from the speed change mode operator 101, and outputs a first control signal corresponding to the low-speed mode signal or a second control signal corresponding to the high-speed mode signal.

The controller 103 may include an Electronic Controller Unit (ECU) or a Micro Controller Unit (MCU).

The generation-signal provider 105 is provided to provide a generation signal output from a generator 104.

The generation-signal provider 105 may include a generation-signal rectification part 105a and a generation-signal storage part 105b.

The generation-signal rectification part 105a may be electrically connected to the generator 104 to rectify the generation signal output from the generator 104.

The generation-signal rectification part 105a may include more than one second rectifying diode D2 and D3, more than one fourth rectifying diode D4 and D5, and more than one sixth rectifying diode D6 and D7.

The more than one second rectifying diode D2 and D3 may be electrically connected to one side of the generator 104, and the more than one fourth rectifying diode D4 and D5 may be electrically connected to another side of the generator 104.

The more than one second rectifying diode D2 and D3 may include a second rectifying diode D2 and a third rectifying diode D3 connected to each other in series.

The more than one fourth rectifying diode D4 and D5 may include a fourth rectifying diode D4 and a fifth rectifying diode D5 connected to each other in series.

The more than one sixth rectifying diode D6 and D7 may be electrically connected to the other side of the generator 104.

The more than one sixth rectifying diodes D6 and D7 may include a sixth rectifying diode D6 and a seventh rectifying diode D7 connected to each other in series.

The generation-signal storage part 105b may be electrically connected to the generation-signal rectification part 105a to store the generation signal rectified in the generation-signal rectification part 105a.

The generation-signal storage part 105b may include more than one second capacitor C2, C3 and C4, which is electrically connected to the generation-signal rectification part 105a and the motor-driver operating-signal regulator 107 that will be described hereinafter.

The more than one second capacitor C2, C3 and C4 may include a second capacitor C2, a third capacitor C3, and a fourth capacitor C4 connected to one another in series.

The more than one second capacitor C2, C3 and C4 may be a smoothing capacitor.

The motor-driver operating-signal regulator 107 receives a first control signal or second control signal when the speed change mode operator 101 outputs a low-speed mode signal or high-speed mode signal, regulates a level of generation signal output from the generation-signal provider 105, and applies the resulting signal to the motor driver 108 that drives a motor 110. The motor-driver operating-signal regulator 107 provides a lowered level of the generation signal to the motor driver 108 that is operated upon receiving power of a battery 106 and cuts off an abnormal signal from the motor driver 108.

The motor driver 108 may be a three-phase motor driver.

Specifically, the motor-driver operating-signal regulator 107 may include a first switching device SW1, more than one first resistor R1 and R2, more than one third resistor R3, more than one fourth resistor R4, R5 and R6, and a second switching device SW2.

The first switching device SW1 may be electrically connected to one side of the controller 103, and the more than one first resistor R1 and R2 may be electrically connected to the other side of the controller 103 and first switching device SW1.

The more than one first resistor R1 and R2 may include a first resistor R1 and a second resistor R2 for partial pressure.

The first switching device SW1 may include at least one of a Metal-Oxide Semiconductor Field Effect Transistor (MOSFET) and a Bipolar Junction Transistor (BJT).

The more than one third resistor R3 may be electrically connected to the first switching device SW1, motor driver 108 and battery 106.

The more than one fourth resistor R4, R5 and R6 may be electrically connected to the more than one third resistor R3 and first switching device SW1. The second switching device SW2 may be electrically connected to the generation-signal provider 105 and the more than one fourth resistor R4, R5 and R6.

The more than one fourth resistor R4, R5 and R6 may include a fourth resistor R4, fifth resistor R5 and sixth resistor R6 for partial pressure.

The second switching device SW2 may include at least one of an MOSFET and a BJT.

The second switching device SW2 may include more than one zener diode ZD2, which is electrically connected to the generation-signal provider 105 and the more than one fourth resistor R4, R5 and R6 to cut off an abnormal signal from the first switching device SW1.

The motor-driver operating-signal regulator 107 may further include more than one zener diode ZD1, which is electrically connected to the generation-signal provider 105 and the more than one fourth resistor R4, R5 and R6 to cut off an abnormal signal from the first switching device SW1.

That is, the more than one zener diode ZD1 is electrically connected to the generation-signal provider 105 and one resistor R6 among the more than one fourth resistor R4, R5 and R6 to cut off an abnormal signal from the first switching device SW1.

The motor-driver operating-signal regulator 107 creates a first current-path between the more than one third resistor R3 and the more than one fourth resistor R4, R5 and R6. When the speed change mode operator 101 outputs a low-speed mode signal or high-speed mode signal, the motor-driver operating-signal regulator 107 receives a first control signal or second control signal from the controller 103, turning on the first switching device SW1. The motor-driver operating-signal regulator 107 also creates a second current-path between the more than one third resistor R3 and the more than one fourth resistor R4, R5 and R6 to thereby turn on the second switching device SW2. As such, the motor-driver operating-signal regulator 107 may regulate the level of generation signal from the generation-signal provider 105 via the more than one third resistor R3 and the more than one fourth resistor R4, R5 and R6, so as to lower the level of generation signal to be transmitted to the motor driver 108 that is operated upon receiving power of the battery 106.

On the other hand, the motor-driver operating-signal regulator 107 may temporarily turn off the first switching device SW1 to prevent an abnormal signal transmitted from the motor driver 108 from being transmitted to at least one of the generator 104 and the motor driver 108 via the more than one third resistor R3 that is electrically connected to the first switching device SW1.

The more than one capacitor C1 may be electrically connected to the second switching device SW2, more than one third resistor R3 and battery 106.

The more than one capacitor C1 may be a smoothing capacitor.

The more than one capacitor C1 may temporarily store the regulated generation signal, and then provide the signal to the motor 110 at an operating time of the motor driver 108.

The more than one capacitor C1 may remove a noise signal from the regulated generation signal, and provide the resulting signal to the motor 110.

More than one rectifying diode D1 may be electrically connected to the second switching device SW2, more than one capacitor C1 and battery 106, to rectify power output from the battery 106 and apply the power to the motor driver 108.

Hereinafter, a method to drive the electric bicycle 10 using the electric bicycle driving apparatus 100 according to the first embodiment of the present invention will be described.

First, the method to drive the electric bicycle 10 using the electric bicycle driving apparatus 100 according to the first embodiment of the present invention includes outputting a low-speed mode signal or high-speed mode signal from the speed change mode operator 101.

Thereafter, the method to drive the electric bicycle 10 using the electric bicycle driving apparatus 100 according to the first embodiment of the present invention includes receiving a first control signal or second control signal transmitted from the controller 103 to the motor-driver operating-signal regulator 107 when the speed change mode operator 101 outputs a low-speed mode signal or high-speed mode signal, lowering a level of generation signal output from the generation-signal provider 105 using the motor-driver operating-signal regulator 107, and driving the motor 110 based on the lowered level of generation signal using the motor driver 108 that is operated upon receiving power of the battery 106.

At this time, the method to drive the electric bicycle 10 using the electric bicycle driving apparatus 100 according to the first embodiment of the present invention includes cutting off an abnormal signal from the motor driver 108 using the motor-driver operating-signal regulator 107.

As described above, the electric bicycle driving apparatus 100 according to the first embodiment of the present invention includes the speed change mode operator 101, controller 103, generation-signal provider 105, motor-driver operating-signal regulator 107, and motor driver 108.

Accordingly, the electric bicycle driving apparatus 100 according to the first embodiment of the present invention may lower the level of generation signal to provide the resulting signal to the motor driver 108 that is operated upon receiving power of the battery 106, which may result in a reduction in battery power consumption.

Additionally, the electric bicycle driving apparatus 100 according to the first embodiment of the present invention may cut off an abnormal signal from the motor driver 108, which may prevent malfunction and stabilize drive properties of the electric bicycle.

Second Embodiment

Figure 4:
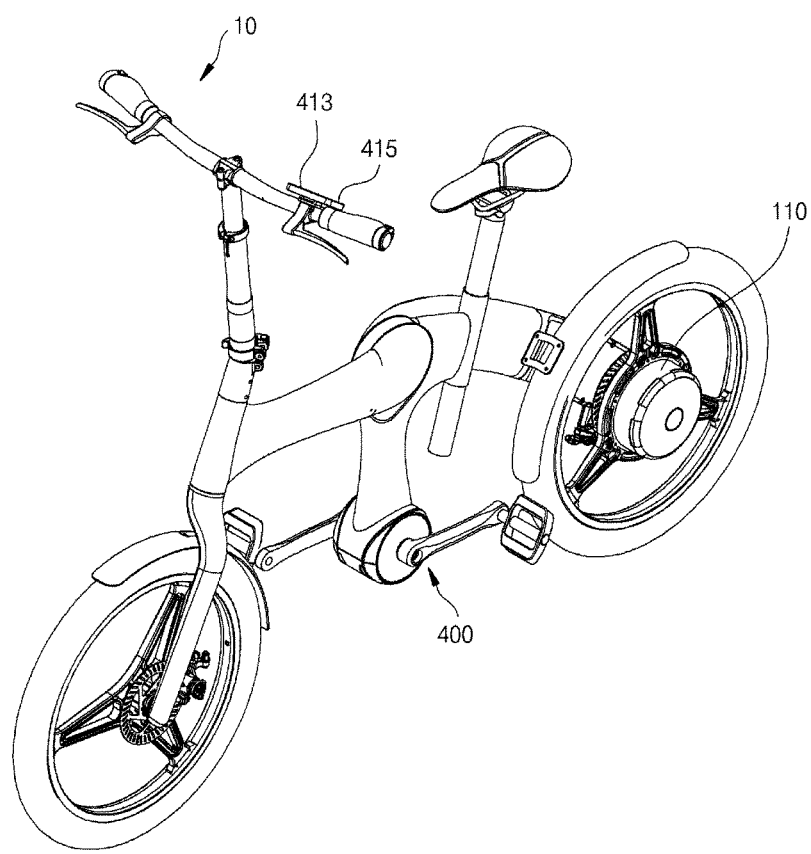
FIG. 4 is a perspective view illustrating an electric bicycle including an electric bicycle driving apparatus according to a second embodiment of the present invention.
Figure 5:
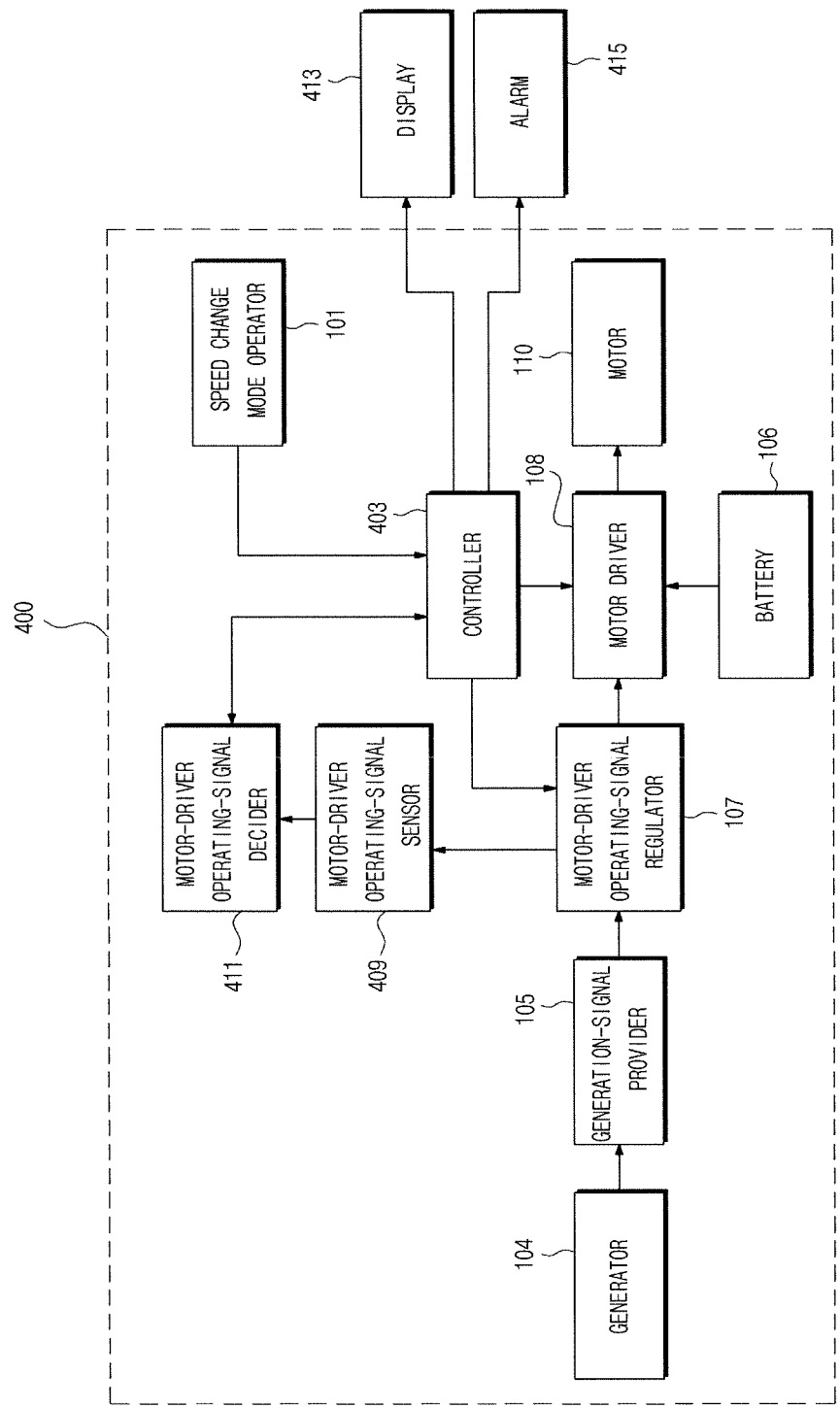
FIG. 5 is a block diagram illustrating the configuration of the electric bicycle driving apparatus according to the second embodiment of the present invention.

FIG. 4 is a perspective view illustrating an electric bicycle including an electric bicycle driving apparatus according to a second embodiment of the present invention, and FIG. 5 is a block diagram illustrating the configuration of the electric bicycle driving apparatus according to the second embodiment of the present invention.

Figure 6:
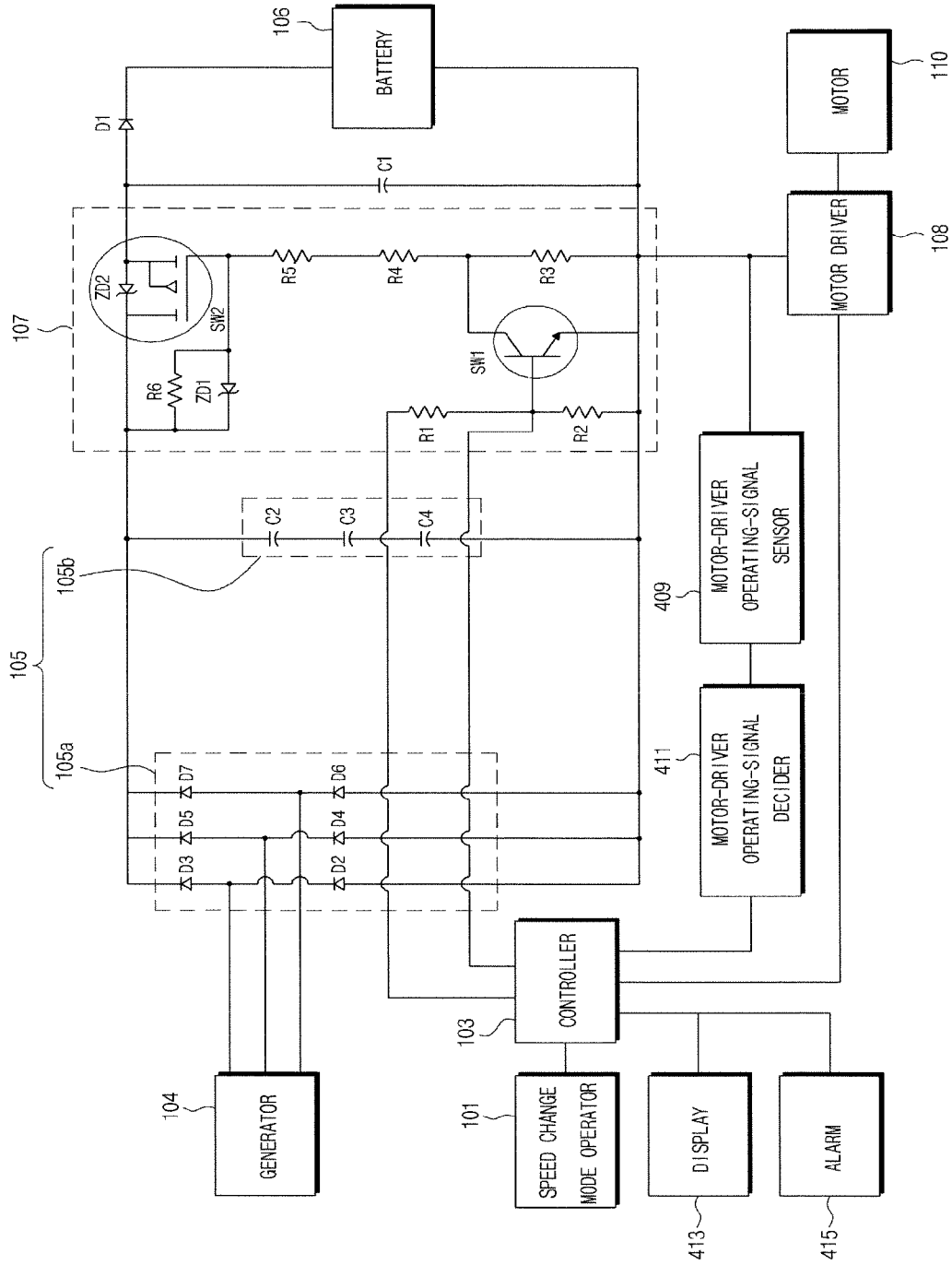
FIG. 6 is an equivalent circuit diagram of another example of the electric bicycle driving apparatus according to the second embodiment of the present invention.

FIG. 6 is an equivalent circuit diagram illustrating an example of the electric bicycle driving apparatus according to the second embodiment of the present invention.

Referring to FIG. 4, an electric bicycle driving apparatus 400 according to the second embodiment of the present invention is provided at either side of the electric bicycle 10.

Referring to FIGS. 5 and 6, the electric bicycle driving apparatus 400 according to the second embodiment of the present invention includes the speed change mode operator 101, controller 403, generation-signal provider 105, motor-driver operating-signal regulator 107, motor-driver operating-signal sensor 409, motor-driver operating-signal decider 411, display 413, and alarm 415.

The speed change mode operator 101 outputs a low-speed mode signal or high-speed mode signal.

The speed change mode operator 101 may be installed to the handle of the electric bicycle 10.

The controller 103 receives the low-speed mode signal or high-speed mode signal output from the speed change mode operator 101, and outputs a first control signal corresponding to the low-speed mode signal or a second control signal corresponding to the high-speed mode signal.

The controller 103 may include an ECU or an MCU.

The generation-signal provider 105 is for provision of a generation signal output from the generator 104.

The generation-signal provider 105 may include the generation-signal rectification part 105a and the generation-signal storage part 105b.

The generation-signal rectification part 105a may be electrically connected to the generator 104 to rectify the generation signal output from the generator 104.

The generation-signal rectification part 105a may include the more than one second rectifying diode D2 and D3, more than one fourth rectifying diode D4 and D5, and more than one sixth rectifying diode D6 and D7.

The more than one second rectifying diode D2 and D3 may be electrically connected to one side of the generator 104, and the more than one fourth rectifying diode D4 and D5 may be electrically connected to another side of the generator 104.

The more than one second rectifying diode D2 and D3 may include the second rectifying diode D2 and third rectifying diode D3 connected to each other in series.

The more than one fourth rectifying diode D4 and D5 may include the fourth rectifying diode D4 and fifth rectifying diode D5 connected to each other in series.

The more than one sixth rectifying diode D6 and D7 may be electrically connected to the other side of the generator 104.

The more than one sixth rectifying diode D6 and D7 may include the sixth rectifying diode D6 and seventh rectifying diode D7 connected to each other in series.

The generation-signal storage part 105b may be electrically connected to the generation-signal rectification part 105a to store the generation signal rectified in the generation-signal rectification part 105a.

The generation-signal storage part 105b may include more than one second capacitor C2, C3 and C4, which is electrically connected to the generation-signal rectification part 105a and the motor-driver operating-signal regulator 107 that will be described hereinafter.

The more than one second capacitor C2, C3 and C4 may include the second capacitor C2, third capacitor C3, and fourth capacitor C4 connected to one another in series.

The more than one second capacitor C2, C3 and C4 may be a smoothing capacitor.

The motor-driver operating-signal regulator 107 receives a first control signal or second control signal when the speed change mode operator 101 outputs a low-speed mode signal or high-speed mode signal, regulates a level of generation signal output from the generation-signal provider 105, and applies the resulting signal to the motor driver 108 that drives a motor 110. The motor-driver operating-signal regulator 107 provides a lowered level of the generation signal to the motor driver 108 that is operated upon receiving power of a battery 106 and cuts off an abnormal signal from the motor driver 108.

The motor driver 108 may be a three-phase motor driver.

Specifically, the motor-driver operating-signal regulator 107 may include the first switching device SW1, more than one first resistor R1 and R2, more than one third resistor R3, more than one fourth resistor R4, R5 and R6, and second switching device SW2.

The first switching device SW1 may be electrically connected to one side of the controller 103, and the more than one first resistor R1 and R2 may be electrically connected to the other side of the controller 103 and the first switching device SW1.

The more than one first resistor R1 and R2 may include the first resistor R1 and second resistor R2 for partial pressure.

The first switching device SW1 may include at least one of an MOSFET and a BJT.

The more than one third resistor R3 may be electrically connected to the first switching device SW1, motor driver 108 and battery 106.

The more than one fourth resistor R4, R5 and R6 may be electrically connected to the more than one third resistor R3 and first switching device SW1. The second switching device SW2 may be electrically connected to the generation-signal provider 105 and the more than one fourth resistor R4, R5 and R6.

The more than one fourth resistor R4, R5 and R6 may include the fourth resistor R4, fifth resistor R5 and sixth resistor R6 for partial pressure.

The second switching device SW2 may include at least one of an MOSFET and a BJT.

The second switching device SW2 may include more than one zener diode ZD2, which is electrically connected to the generation-signal provider 105 and the more than one fourth resistors R4, R5 and R6 to cut off an abnormal signal from the first switching device SW1.

The motor-driver operating-signal regulator 107 may further include more than one zener diode ZD1, which is electrically connected to the generation-signal provider 105 and the more than one fourth resistors R4, R5 and R6 to cut off an abnormal signal from the first switching device SW1.

That is, the more than one zener diode ZD1 is electrically connected to the generation-signal provider 105 and one resistor R6 among the more than one fourth resistor R4, R5 and R6 to cut off an abnormal signal transmitted from the first switching device SW1.

The motor-driver operating-signal regulator 107 creates a first current-path between the more than one third resistor R3 and the more than one fourth resistor R4, R5 and R6. When the speed change mode operator 101 outputs a low-speed mode signal or high-speed mode signal, the motor-driver operating-signal regulator 107 receives a first control signal or second control signal from the controller 103, turning on the first switching device SW1. The motor-driver operating-signal regulator 107 also creates a second current-path between the more than one third resistor R3 and the more than one fourth resistor R4, R5 and R6 to thereby turn on the second switching device SW2. As such, the motor-driver operating-signal regulator 107 may regulate the level of generation signal from the generation-signal provider 105 via the more than one third resistor R3 and the more than one fourth resistor R4, R5 and R6, so as to lower the level of generation signal to be transmitted to the motor driver 108 that is operated upon receiving power of the battery 106.

On the other hand, the motor-driver operating-signal regulator 107 may temporarily turn off the first switching device SW1 to prevent an abnormal signal transmitted from the motor driver 108 from being transmitted to at least one of the generator 104 and motor driver 108 via the more than one third resistor R3 that is electrically connected to the first switching device SW1.

The more than one capacitor C1 may be electrically connected to the second switching device SW2, more than one third resistor R3 and battery 106.

The more than one capacitor C1 may be a smoothing capacitor.

The more than one capacitor C1 may temporarily store the regulated generation signal, and then provide the signal to the motor 110 at an operating time of the motor driver 108.

The more than one capacitor C1 may remove a noise signal from the regulated generation signal, and provide the resulting signal to the motor 110.

The more than one rectifying diode D1 may be electrically connected to the second switching device SW2, more than one capacitor C1 and battery 106, to rectify power output from the battery 106 and apply the power to the motor driver 108.

The motor-driver operating-signal sensor 409 may be electrically connected to the motor-driver operating-signal regulator 107 and the motor driver 108, and serve to sense a current operating signal for the motor driver 108 output from the motor-driver operating-signal regulator 107.

The motor-driver operating-signal sensor 409 may include a current sensor (not shown) or a voltage sensor (not shown) to detect the operating signal for the motor driver 108.

The controller 403 may contain a preset reference range of the operating signal for the motor driver 108. The motor-driver operating-signal decider 411 may decide whether or not the current operating signal for the motor driver 108 sensed by the motor-driver operating-signal sensor 409 is within the reference range of the operating signal for the motor driver 108 under control of the controller 403.

If it is decided by the motor-driver operating-signal decider 411 that the current operating signal for the motor driver 108 is not within the reference range of the operating signal for the motor driver 108, the controller 403 may temporarily stop operation of the motor driver 108.

In this case, if it is decided by the motor-driver operating-signal decider 411 that the current operating signal for the motor driver 108 sensed by the motor-driver operating-signal sensor 409 is not within the reference range of the operating signal for the motor driver 108, the controller 403 may provide a display signal to the display 413.

The display 413 may include a Human Machine Interface (HMI) module (not shown) to indicate the state of the current operating signal for the motor driver 108 via a HMI message output from the HMI module (not shown).

If it is decided by the motor-driver operating-signal decider 411 that the current operating signal for the motor driver 108 is not within the reference range of the operating signal for the motor driver 108, the controller 403 may provide an alarm signal to the alarm 415.

The alarm 415 may include a speaker (not shown) or an alarm device (not shown) to indicate the state of the current operating signal of the motor driver 108 via voice or alarm sound output from the speaker (not shown) or the alarm device (not shown).

Hereinafter, a method to drive the electric bicycle 10 using the electric bicycle driving apparatus 400 according to the second embodiment of the present invention will be described.

First, the method to drive the electric bicycle 10 using the electric bicycle driving apparatus 400 according to the second embodiment of the present invention includes outputting a low-speed mode signal or high-speed mode signal from the speed change mode operator 101.

Thereafter, the method to drive the electric bicycle 10 using the electric bicycle driving apparatus 400 according to the second embodiment of the present invention includes receiving a first control signal or second control signal transmitted from the controller 103 to the motor-driver operating-signal regulator 107 when the speed change mode operator 101 outputs a low-speed mode signal or high-speed mode signal, lowering a level of generation signal output from the generation-signal provider 105 using the motor-driver operating-signal regulator 107, and driving the motor 110 based on the lowered level of generation signal using the motor driver 108 that is operated upon receiving power of the battery 106.

The method to drive the electric bicycle 10 using the electric bicycle driving apparatus 400 according to the second embodiment of the present invention includes cutting off an abnormal signal from the motor driver 108 using the operating signal regulator 107.

Thereafter, the method to drive the electric bicycle 10 using the electric bicycle driving apparatus 400 according to the second embodiment of the present invention includes sensing a current operating signal for the motor driver 108 output from the motor-driver operating-signal regulator 107 using the motor-driver operating-signal sensor 409.

Thereafter, the method to drive the electric bicycle 10 using the electric bicycle driving apparatus 400 according to the second embodiment of the present invention includes deciding, using the motor-driver operating-signal decider 411 under control of the controller 403, whether or not the current operating signal for the motor driver 108 sensed by the motor-driver operating-signal sensor 409 is within a reference range of the operating signal for the motor driver 108 preset by the controller 403.

Thereafter, the method to drive the electric bicycle 10 using the electric bicycle driving apparatus 400 according to the second embodiment of the present invention includes temporarily stopping operation of the motor driver 108 using the controller 403 if it is decided by the motor-driver operating-signal decider 411 that the current operating signal for the motor driver 108 is not within the reference range of the operating signal for the motor driver 108.

In this case, the method to drive the electric bicycle 10 using the electric bicycle driving apparatus 400 according to the second embodiment of the present invention includes providing a display signal to the display 413 under control of the controller 403 if it is decided by the motor-driver operating-signal decider 411 that the current operating signal for the motor driver 108 is not within the reference range of the operating signal for the motor driver 108.

Additionally, the method to drive the electric bicycle 10 using the electric bicycle driving apparatus 400 according to the second embodiment of the present invention includes providing an alarm signal to the alarm 415 under control of the controller 403 if it is decided by the motor-driver operating-signal decider 411 that the current operating signal for the motor driver 108 is not within the reference range of the operating signal for the motor driver 108.

As described above, the electric bicycle driving apparatus 400 according to the second embodiment of the present invention includes the speed change mode operator 101, controller 103, generation-signal provider 105, motor-driver operating-signal regulator 107, motor driver 108, motor-driver operating-signal sensor 409, and motor-driver operating-signal decider 411.

Accordingly, the electric bicycle driving apparatus 400 according to the second embodiment of the present invention may lower the level of generation signal to provide the resulting signal to the motor driver 108 that is operated upon receiving power of the battery 106, which may result in a reduction in battery power consumption.

Additionally, the electric bicycle driving apparatus 400 according to the second embodiment of the present invention may cut off an abnormal signal transmitted to the motor driver 108, which may prevent malfunction and stabilize drive properties of the electric bicycle.

Moreover, the electric bicycle driving apparatus 400 according to the second embodiment of the present invention may temporarily stop operation of the motor driver 108 using the controller 403 if it is decided by the motor-driver operating-signal decider 411 that the current operating signal for the motor driver 108 is not within the reference range of the operating signal for the motor driver 108, and may perform at least one of provision of a display signal to the display 413 and provision of an alarm signal to the alarm 415 under control of the controller 403.

In this way, the electric bicycle driving apparatus 400 according to the second embodiment of the present invention may discriminate an abnormal signal transmitted from the motor driver 108 and prevent damage to the motor driver 108 due to an abnormal signal, which results in reduced repair and maintenance time and costs.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An electric bicycle driving apparatus comprising:
   a speed change mode operator to output a low-speed mode signal or a high-speed mode signal;
   a controller to receive the low-speed mode signal or high-speed mode signal output from the speed change mode operator and output a first control signal corresponding to the low-speed mode signal or a second control signal corresponding to the high-speed mode signal;
   a generation-signal provider to provide a generation signal output from a generator;
   a motor-driver operating-signal regulator to receive the first control signal or second control signal when the speed change mode operator outputs the low-speed mode signal or high-speed mode signal, to regulate a level of the generation signal output from the generation-signal provider and to provide the resulting signal to a motor driver that drives a motor, wherein the motor-driver operating-signal regulator provides a lowered level of generation signal to the motor driver that is operated upon receiving power of a battery, and cuts off an abnormal signal transmitted from the motor driver;
   a motor-driver operating-signal sensor electrically connected to the motor-driver operating-signal regulator and motor driver, the sensor serving to sense a current operating signal for the motor driver output from the motor-driver operating-signal regulator, wherein the controller contains a preset reference range of the operating signal for the motor driver; and
   a motor-driver operating-signal decider to decide whether or not the current operating signal for the motor driver sensed by the motor-driver operating-signal sensor is within the reference range of the operating signal for the motor driver under control of the controller, wherein the controller temporarily stops operation of the motor driver if the motor-driver operating-signal decider decides that the current operating signal for the motor driver is not within the reference range of the operating signal for the motor driver.

2. The apparatus according to claim 1, wherein the motor-driver operating-signal regulator includes:
   a first switching device electrically having a first terminal connected to a first output node of the controller;
   a first resistor electrically connected between the first output node and a second output node of the controller, and a second resistor connected between the first output node of the controller and a second terminal of the first switching device;
   a third resistor electrically connected between the second terminal and a third terminal of the first switching device, wherein the second terminal of the first switching device is connected to the motor driver and the battery;
   a fourth resistor electrically connected to the third resistor and the third terminal of the first switching device; and
   a second switching device electrically connected between a first terminal of the generation-signal provider and the fourth resistor.

3. The apparatus according to claim 2, wherein the node common to the second resistor and to the second terminal of the first switching device is connected to a second terminal of the generation-signal provider.

4. The apparatus according to claim 2, wherein the motor-driver operating-signal regulator further includes a fifth resistor connected between the first terminal of the generation-signal provider and the node common to the second switching device and the fourth resistor.

5. The apparatus according to claim 2, wherein each of the first switching device and the second switching device includes at least one of a Metal-Oxide Semiconductor Field Effect Transistor (MOSFET) and a Bipolar Junction Transistor (BJT).

6. The apparatus according to claim 2, wherein the motor-driver operating-signal regulator further includes a zener diode electrically connected between the first terminal of the generation-signal provider and the node common to the second switching device and the fourth resistor.

7. The apparatus according to claim 2, wherein the second switching device includes more than one zener diode electrically connected to the generation-signal provider and more than one fourth resistor.

8. The apparatus according to claim 2, wherein the motor-driver operating-signal regulator further includes a capacitor electrically connected between the second switching device and the second terminal of the first switching device.

9. The apparatus according to claim 8, wherein the more than one capacitor is a smoothing capacitor.

10. The apparatus according to claim 8, wherein the motor-driver operating-signal regulator further includes a rectifying diode electrically connected between the battery and the node common to the second switching device and the capacitor.

11. The apparatus according to claim 1, wherein the controller provides a display signal to a display if the motor-driver operating-signal decider decides that the current operating signal for the motor driver is not within the reference range of the operating signal for the motor driver.

12. The apparatus according to claim 1, wherein the controller provides an alarm signal to an alarm unit if the motor-driver operating-signal decider decides that the current operating signal for the motor driver is not within the reference range of the operating signal for the motor driver.

13. The apparatus according to claim 1, wherein the generation-signal provider includes:
   a generation-signal rectification part electrically connected to the generator to rectify the generation signal output from the generator; and
   a generation-signal storage part electrically connected to the generation-signal rectification part to store the generation signal rectified in the generation-signal rectification part.

14. The apparatus according to claim 13, wherein the generator includes first, second, and third output nodes, and
   wherein the generation-signal rectification part includes:
      more than one second rectifying diode electrically connected to the first output node of the generator;
      more than one fourth rectifying diode electrically connected to the second output node of the generator; and
      more than one sixth rectifying diode electrically connected to the third output node of the generator.

15. The apparatus according to claim 14, wherein the more than one second rectifying diode includes a second rectifying diode and a third rectifying diode connected to each other in series between first and second terminals of the generation-signal provider, and the first output node of the generator is electrically connected to a node common to the second and third rectifying diodes.

16. The apparatus according to claim 15, wherein the more than one fourth rectifying diode includes a fourth rectifying diode and a fifth rectifying diode connected to each other in series between the first and second terminals of the generation-signal provider, and the second output node of the generator is electrically connected to a node common to the fourth and fifth rectifying diodes.

17. The apparatus according to claim 16, wherein the more than one sixth rectifying diode includes a sixth rectifying diode and a seventh rectifying diode connected to each other in series between the first and second terminals of the generation-signal provider, and the third output node of the generator is electrically connected to a node common to the sixth and seventh rectifying diodes.

18. The apparatus according to claim 13, wherein the generation-signal storage part includes more than one second capacitor electrically connected to the generation-signal rectification part and motor-driver operating-signal regulator.

19. The apparatus according to claim 18, wherein the more than one second capacitor includes a second capacitor, a third capacitor and a fourth capacitor connected to one another in series between first and second terminals of the generation-signal provider.

20. The apparatus according to claim 18, wherein the more than one second capacitor includes a smoothing capacitor.

\* \* \* \* \*